United States Patent
Fontenele et al.

(10) Patent No.: US 11,598,665 B2
(45) Date of Patent: Mar. 7, 2023

(54) LOW-COST AUTONOMOUS SOLARIMETRIC STATION

(71) Applicants: PETROLEO BRASILEIRO S.A.-PETROBRAS, Rio de Janeiro (BR); INSTITUTO DE TECNOLOGIA PARA O DESENVOLVIMENTO-LACTEC, Curitiba (BR)

(72) Inventors: Luiz Fernando Almeida Fontenele, Fortaleza (BR); Hugo Tavares Vieira Gouveia, Rio de Janeiro (BR); Gelson Luiz Carneiro, Curitiba (BR); Paulo Henrique Fernandes Ferreira, Niteroi (BR); Rodrigo Dias, Belo Horizonte (BR); Vilson Rodrigo Mognon, Curitiba (BR); Bruno Marchesi, Curitiba (BR); Cleber Onofre Inacio, Rio de Janeiro (BR); Carlos Ademar Purim, Curitiba (BR)

(73) Assignees: PETROLEO BRASILEIRO S.A.—PETROBRAS; INSTITUTO DE TECNOLOGIA PARA O DESENVOLVIMENTO—LACTEC

( * ) Notice: Subject to any disclaimer, the term of this patent is extended or adjusted under 35 U.S.C. 154(b) by 0 days.

(21) Appl. No.: 17/554,684

(22) Filed: Dec. 17, 2021

(65) Prior Publication Data

US 2022/0196470 A1    Jun. 23, 2022

(30) Foreign Application Priority Data

Dec. 21, 2020 (BR) .......................... 2020 026316-1

(51) Int. Cl.
*G01J 1/44* (2006.01)
*H02S 40/38* (2014.01)
(Continued)

(52) U.S. Cl.
CPC .................. *G01J 1/44* (2013.01); *G01C 9/24* (2013.01); *G01S 19/01* (2013.01); *G06N 3/08* (2013.01);
(Continued)

(58) Field of Classification Search
CPC ................. G01J 1/44; G01J 2001/4266; G01J 2001/4285; G01J 2001/446;
(Continued)

(56) References Cited

U.S. PATENT DOCUMENTS

| | | | |
|---|---|---|---|
| 2004/0016865 A1 | 1/2004 | Little | |
| 2017/0288606 A1* | 10/2017 | Takeda | ................... H02S 40/38 |
| 2019/0271756 A1 | 9/2019 | Freeman | |

FOREIGN PATENT DOCUMENTS

WO      2019/008206 A1    1/2019

* cited by examiner

*Primary Examiner* — Tony Ko
(74) *Attorney, Agent, or Firm* — Raphael Bellum PLLC

(57) ABSTRACT

The present invention relates to alternative equipment for solar energy prospecting with a focus on low cost, low complexity in installation, operation and maintenance, and high reliability. A low-cost solarimetric station consists of compact equipment capable of providing global irradiance measurements and estimates for direct and diffuse components, as well as hemispheric photographs, with acceptable levels of uncertainty. The pyranometer periodically provides global irradiance information to the system, and the camera records photos of the sky. Using machine learning algorithms, and based on that information, the equipment provides estimates for direct and diffuse irradiance components. The equipment has other meteorological sensors, GPS, and wireless communication facilities. The equipment has an energy supply and management system consisting of a photovoltaic module, charge controller, and battery, which provide the energy necessary for the station to operate.

21 Claims, 18 Drawing Sheets

(51) Int. Cl.
*H04N 5/225* (2006.01)
*G01C 9/24* (2006.01)
*G01S 19/01* (2010.01)
*G06N 3/08* (2023.01)
*H04N 5/77* (2006.01)
*H04M 1/72403* (2021.01)
*G01J 1/42* (2006.01)
*H02J 7/35* (2006.01)

(52) U.S. Cl.
CPC ......... *H02S 40/38* (2014.12); *H04N 5/22521* (2018.08); *H04N 5/77* (2013.01); *G01J 2001/4266* (2013.01); *G01J 2001/4285* (2013.01); *G01J 2001/446* (2013.01); *H02J 7/35* (2013.01); *H04M 1/72403* (2021.01)

(58) Field of Classification Search
CPC .. G01J 2001/448; G01J 1/0219; G01J 1/0228; G01J 1/0266; G01J 1/0403; G01J 1/0411; G01J 1/42; G01J 1/02; G01C 9/24; G01S 19/01; G06N 3/08; G06N 3/0481; H02S 40/38; H04N 5/22521; H04N 5/77; H04N 5/2257; H02J 7/35; H02J 2207/10; H04M 1/72403; Y02E 10/56; Y02E 70/30
See application file for complete search history.

LOW-COST AUTONOMOUS SOLARIMETRIC STATION

FIELD OF THE INVENTION

The present invention relates to the field of solarimetric stations. The proposal here is to provide a low-cost station that can be used in the solar resource prospecting stage, which is one of the first stages in developing a photovoltaic design/undertaking.

The invention can be installed anywhere where an assessment of solar potential is desired.

DESCRIPTION OF THE STATE OF THE ART

In the Reserve Energy Auctions held from 2014 to 2018, there was a growing volume of investment in the solar energy sector in Brazil with growth prospects for the coming years.

The traditional equipment for prospecting solar resources has proven to be expensive, requiring specialized labor for installation and O&M (Operation and Maintenance). Scientific-standard solarimetric stations have lower levels of uncertainty, but have significant acquisition costs.

The processes of installing, operating, and maintaining solarimetric stations are challenging and highly complex. The main difficulties are the following:
- Long equipment acquisition time, with the purchasing process lasting between 6 and 12 months.
- Long time and great complexity in site preparation and installation of stations, with time elapsed from prospecting locations that meet all requirements to effective installation typically exceeding 12 months.
- Specialized personnel to maintain the stations, particularly due to the use of a solar tracker that is located far from the locations where the stations are installed, often causing data loss.
- Variations in the exchange rate have taken the price of stations, which are built mainly from imported components, to a newly high level.

Basically, there are three types of solarimetric station configurations, which are described briefly below.

The "Advanced" type of configuration has been used in R&D (Research and Development) projects to develop and validate climate models and is comprised of top-of-the-line equipment from a renowned manufacturer.

The "Basic" configuration uses lower cost pyranometers and does not require the use of a tracker and pyreliometer, so it is not suitable for prospecting the solar resource for concentrating systems. However, this is the option that comes closest to the minimum requirements for participating in photovoltaic generation auctions, wherein the shadowband may be dispensed with and the pyranometers operated redundantly.

The "RSI" (Rotating Shadowband Irradiometer) configuration, presented in detail farther below, is a measurement alternative for direct irradiance considered to be of lower cost and its application is more widespread in countries with development of CSP (Concentrated Solar Power) projects.

TABLE 1

Typical configurations for solarimetric stations.

| | Advanced | Basic | RSI |
|---|---|---|---|
| Base configuration | 2 × Class A Ventilated Pyranometer Class A | 2 × Class B Pyranometer Shadowband Compatible Data | 1 × Pyranometer Class C Rotating Shadowband |
| | Pyreliometer Solar Tracker Compatible Datalogger Pyrgeometer Thermo-hygrometer Barometer Pluviometer Anemometer Anemoscope Accessories | Logger Thermo-hygrometer Barometer Pluviometer Anemometer Anemoscope Accessories | Solar Power Kit Compatible Data Logger Thermo-hygrometer Barometer Pluviometer Accessories |
| Components, measures of irradiance | $G_{HOR}$, $G_{DIF}$ and $G_{DIR}$ | $G_{HOR}$ and $G_{DIF}$ | $G_{HOR}$ and $G_{DIF}$ |

Notes:
$G_{HOR}$ means global irradiance, as defined in ABNT NBR 10899. $G_{DIF}$ means diffuse irradiance, as defined in ABNT NBR 10899.
Notes:
$G_{DIR}$ means direct irradiance, as defined in ABNT NBR 10899.

Another type of equipment that has been used in some cases, particularly for conducting research, is a hemispherical camera, which can obtain periodic images of the sky.

A station with "Advanced" configuration produces data with the least possible uncertainty in practical terms. Its price, however, and the complexity of installation and operation prevent it from being used on a large scale when the objective is to prospect the solar resource from different locations to install commercial solar generation. In these cases, the lowest-cost options tend to be used by developers.

Complete statistical characterization of meteorological variables at a given location, such as solar irradiance, requires approximately 30 years of data. However, quality irradiance measurement data for such a long period is rarely available for the locations of interest. Thus, the most-used method is satellite models, which have global coverage and in many cases for a period exceeding 10 years, for the initial work of solar resource characterization. Due to the solar resource's extreme sensitivity to the microclimate, the performance of satellite models tends to vary greatly between different locations, and can have an average bias error of up to 10%.

The most accurate assessment of the potential for solar generation necessarily involves the collection and application of irradiance measurement data from the location of interest, even if for a shorter period. Measurements that are quality controlled can, after one year, be used to validate and correct systematic deviations from the long-term estimates of satellite models, thus reducing the uncertainty associated with the mean values and the interannual variability of the solar resource. This "adaptation" of data from the model to short-term measurement is current practice in certification work of generation potential in solar projects.

RSI-type equipment is a lower-cost option for local measurement of the solar resource. This alternative has been considered mainly in cases in which there is interest in generation systems with concentration, or without concentration with tracking, which require higher-quality data for $G_{DIR}$. A commercial RSI, such as the RSI shown in Table 1, basically consists of a pyranometer photodiode sensor with a very low response time (10 μs) that is mounted horizontally, and a rotating shadowband. In general, the band shades the sensor once per minute for a brief period of time, thus providing a measure of diffuse irradiance. From the measurement of $G_{HOR}$ and $G_{DIF}$ an estimate for $G_{DIF}$ can be calculated.

Photodiode pyranometers are significantly cheaper than thermopile-type pyranometers. This price reduction, however, comes at the expense of a greater level of uncertainty in the resulting irradiance measurements. In fact, photodiode pyranometers are not even considered in ISO Standard 9060:2018 on classification of pyranometers.

The accuracy of its measurements, which, using the manufacturer's simplest calibration, has uncertainty of 5% to 10%, can be significantly improved by using different calibration techniques and by correcting systematic deviations that are mainly caused by limited spectral sensitivity, dependence on the temperature of the sensor, and the response to the cosine effect. A method of calculating uncertainty in radiometers shows that there is a reduction from 8% to 4% when applying corrections for $G_{HOR}$ measurements of photodiode pyranometers, and 4.1% for uncorrected thermopile pyranometers (which is the most common case). For indirect measurement of $G_{DIR}$ with RSI, uncertainties of up to 2% for annual values have been reported after corrections.

It is important to point out that despite the reduced uncertainty, since measurements obtained using photodiode pyranometers (thus including measurements obtained with RSI) do not meet the requirements of ISO standard 9060:2018, they are not currently valid for qualification purposes in photovoltaic solar energy auctions. However, the uncertainty levels reported in the literature after due corrections show that measurements of this type can be very useful in the initial phases of solar generation projects to verify the quality of the estimates of the satellite models for both $G_{HOR}$ and $G_{DIR}$.

In addition, a $G_{HOR}$ measurement system that allows for improvement in estimating the diffuse irradiance portion (and consequently the direct portion) may lead to an energy calculation generated with less uncertainty than a measurement array that uses a thermopile pyranometer and that measures only $G_{HOR}$ In the latter case, it is necessary to break down the components using empirical models. FIG. 1 shows an example of the diffuse fraction obtained by measurement and the correlation curve of a popular empirical model. Significant deviations may be obtained in calculating the $G_{TOT}$ or $G_{DIR}$, mainly impacting the results of systems with tracking.

Document US20190271756A1 reveals a solar monitoring system for measuring the intensity of solar radiation, comprising a tracking unit with two-axis movement, assembled with two irradiance measuring units and one controller. The first irradiance measuring unit comprises a direct normal irradiance sensor ($G_{DIR}$), and the second irradiance measuring unit includes a diffuse horizontal irradiance sensor (DHI) and a global horizontal irradiance sensor ($G_{HOR}$). However, it is a system that does not employ some features of the invention that will be described later in more detail, such as an all sky camera and the use of artificial intelligence.

Document US20040016865A1 reveals a pyranometer for measuring solar irradiance and comprises a light detector adapted to produce an output signal in response to incident solar radiation, a reversible motor with a curved shadowband connected to its output axis, means for assembling the light detector and motor so that the shadowband is at a fixed distance from the light detector; a motor controller adapted to cause the motor to periodically rotate the shadowband from one of two threshold positions to another, with the shadowband acting to momentarily shade the light detector as it moves between its two threshold positions. However, the document does not reveal image acquisition (camera and fisheye lens), and it does not reveal that wireless communication with a computer or smartphone is possible.

Document WO2019008206A1 reveals a low-maintenance autonomous system for recording solar irradiance comprising a ventilated pyranometer, a shadowband, and a framework with movable supports. The system was designed to operate autonomously with a cleaning apparatus to clean the sensor by blowing compressed air and brushing; a means for guiding the shadowband and a protective arm; a power supply, which includes a battery and a photovoltaic module; a control device with a control panel coupled to the guidance apparatus to establish the position of the shadowband in relation to the sensor and to establish measurement intervals for sun, shadow, and inactivity according to geographic position, calendar date, time of day, and time of pyranometer response. Acquisition means recording the measurements taken and storing them in the memory. However, it is a system that does not employ some features of the invention that will be described later in more detail, such as an all sky camera and the use of artificial intelligence.

The state of the art mentioned above does not have the unique characteristics that will be presented in detail below.

BRIEF DESCRIPTION OF THE INVENTION

The aforementioned challenges and complexity were the impetus for developing alternative equipment for solar energy prospecting with a focus on low cost, low complexity in installation, operation and maintenance, and high reliability. With this invention it is possible to reduce the cost of solar resource prospecting and gain speed in the process of implementing a photovoltaic design/undertaking, obtaining a differential.

The present invention is alternative equipment for solar energy prospecting with a focus on low cost, low complexity in installation, operation and maintenance, and high reliability. It also uses machine learning algorithms. Machine learning is a form of artificial intelligence in which a computer algorithm builds learning models for solving problems from data.

The compact equipment [is] capable of providing global irradiance measurement and estimating direct and diffuse components, as well as hemispheric photographs, with acceptable levels of uncertainty.

The pyranometer periodically provides global irradiance information to the system, and the camera records photos of the sky. Using machine learning algorithms, and based on that information, the equipment provides estimates for direct and diffuse irradiance components. The equipment also has other meteorological sensors, GPS, and wireless communication facilities, such as Wi-Fi and cellular networks. The equipment has a photovoltaic system that is comprised of photovoltaic modules, charge controllers, and batteries, which supply the energy necessary for station operation. Among other requirements, the equipment must be able to operate autonomously.

BRIEF DESCRIPTION OF THE DRAWINGS

The present invention will be described in more detail below, with reference to the attached figures which, in a schematic and non-limiting manner, show examples of its realization. The drawings include.

DETAILED DESCRIPTION OF THE INVENTION

Figure 1:
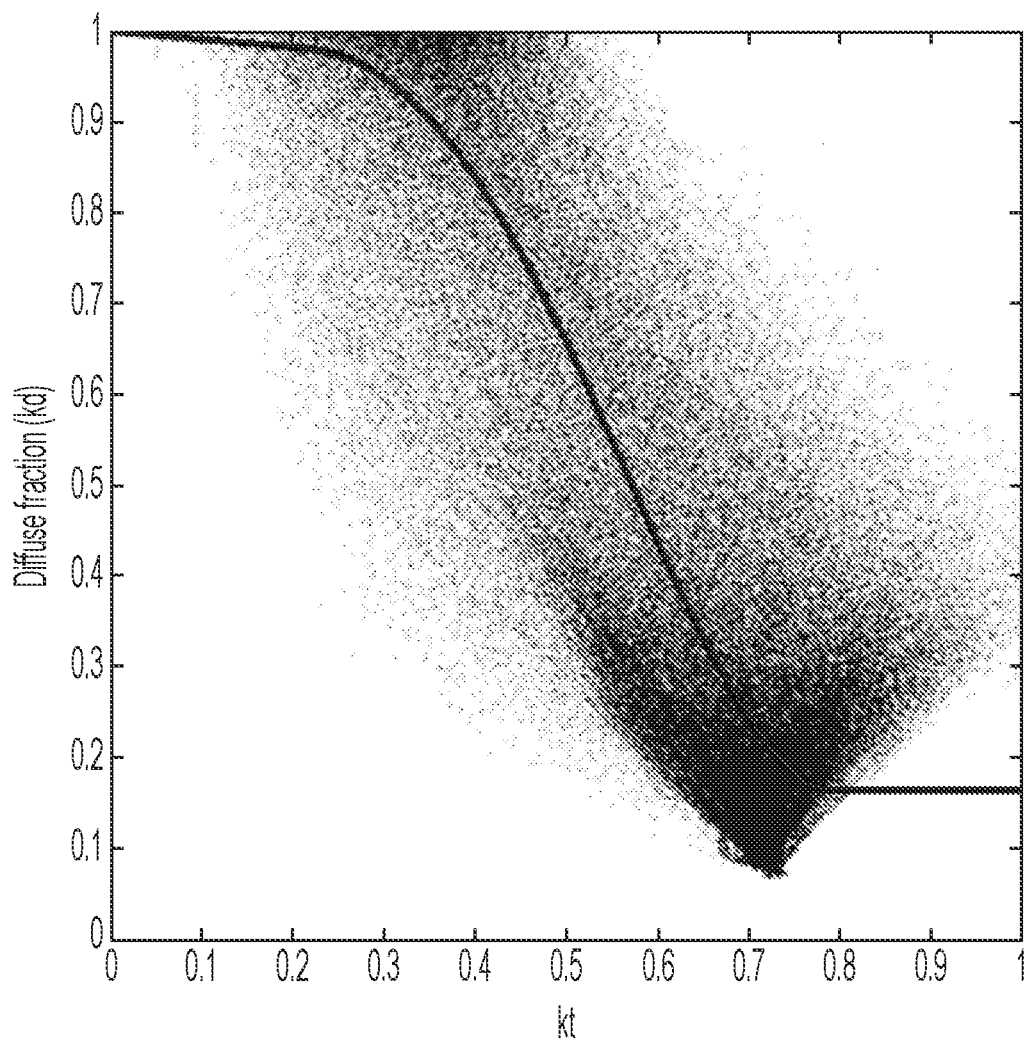
FIG. 1 contains a graph that shows the correlation between diffuse fraction and the lightness index on the 1-minute scale.

First, note that the following description will begin with preferred embodiments of the invention. As will be evident to those skilled in the art, however, the invention is not limited to these particular embodiments, but only to the scope of protection defined in the claims.

Based on an analysis of the state of the art, alternative equipment for solar energy prospecting was developed with a focus on low cost, compact size, low complexity to install, operate and maintain, and high reliability.

The compact equipment developed herein is capable of providing global irradiance measurement and estimates for direct and diffuse components, as well as hemispherical photographs of the sky.

The low-cost requirement practically imposes the use of photodiode pyranometers, whose cost is significantly lower, and the development of a data logger with dedicated internal memory (data logger). The use of photodiode pyranometers, as in the case of RSI, is only feasible with the use of corrections to overcome the deficiencies of this type of sensor. Furthermore, the combination of low-cost and high-reliability requirements suggest the use of an approach with no moving parts. Within this context, the addition of a low-cost photographic sensor to obtain hemispheric images, in addition to making this data available for general use, contributes to the procedure for correcting systematic measurement deviations and to calculating direct and diffuse irradiance estimates.

The requirement for ease of installation and operation of the equipment is satisfied by the development of equipment with compact dimensions and without the need for prior infrastructure (cabling and base) for energy and communications. The use of a photodiode pyranometer for the assembly also has the benefit of lower maintenance needs, as the cleaning interval of the irradiance sensor is extended, albeit in the case of the camera's dome. The camera is also equipped with a filter to minimize the effect of saturation caused by the reflection of the camera's dome in clear skies. It is also possible to sample the global irradiance value at higher rates (due to the fast response time as compared to the thermopile pyranometer) in order to improve estimates from the irradiance components.

In general terms, the invention proposed herein has the following technical characteristics:

- A single sensor for measuring photodiode pyranometer-type global irradiance.
- A camera with a low-cost sensor, fisheye lens, and dome.
- A breakdown of direct and diffuse global irradiance components using empirical models, hemispheric photographs, and high-frequency signal analysis.
- Secondary meteorological variables (ambient temperature and humidity) through thermohygrometer measurement.
- Time and location variables provided by GPS.
- Complete available standard wireless communication facilities (for example, Wi-Fi and cellular telephone), including the possibility of remote configuration, monitoring, and downloading data wirelessly or using smartphones, tablets, and notebooks.
- An autonomous station with solar power from a photovoltaic module, battery, and charge controller.
- A compact station with reduced dimensions and weight, easily transportable, and with the minimum necessary infrastructure on site.
- Ease of assembly and installation, allowing it to be attached to horizontal or vertical planes.
- Availability of an application on a cellular telephone or other mobile device via Wi-Fi for monitoring and manual data collection.
- Enclosure with a place to accommodate the station's materials and components.
- Swivel rods for installation on horizontal and vertical surfaces.
- Embedded machine learning software for diffuse irradiance estimates and direct irradiance calculation.

Operating Principle

Measurements and photos can be stored on memory cards.

The equipment has wireless communication, which is the communication protocol used for local downloading of measurements. Wireless communication also allows measurements to be monitored in real time by a smartphone, tablet, or computer that has this technology. Wireless communication may use Wi-Fi or cellular telephony.

Irradiance Measurement

The irradiance measurement block is comprised of a sensor and a circuit for signal conditioning.

The sensor used for measuring irradiance is a photodiode pyranometer.

The output signal of the pyranometer used is a low-magnitude electrical current, which, in order to read and record data, must have an amplified signal that is converted to a voltage signal.

Image Acquisition

The image acquisition module consists of a camera, a fisheye lens, and a dome. The dome is important as it protects the camera from rain and dust. The function of the fisheye lens is to increase the camera's capture angle. The sensor-sampling process takes place every second. If the application's visual panel is active, then the samples are sent to a computer continuously in order to allow the application to be updated with continuously sampled data. From the moment the GPS goes into active state with a guaranteed reliable time stamp and geolocation data, the system date and time are synchronized from this precise time stamp provided by GPS. The system waits for the first turn of the minute value, that is, it waits until the time stamp value shows the value of the seconds reset to zero. At this moment the process of averaging the values of the sensors begins, which is done continuously every 30 samples. Therefore, every minute two 30-second intervals are generated, the first timestamp ending in 00, and the second timestamp ending in 30. Exactly in the middle of each interval a command is sent to the fisheye lens camera to take a picture; that is, during the first interval the command to take a picture is sent at the time stamp ending in 15, and similarly at the time stamp ending in 45 for the second interval. At the end of each interval, the average value information is sent to a computer, which will consolidate the average values calculated from the sensors, the photo of the middle of the interval, and it will estimate the diffuse irradiation value. This procedure is repeated until the end of the day, when the processor receives the command to shut down.

Power Supply

The energy management block interconnects the two available energy sources, a battery, and a photovoltaic module. In addition to providing output voltages at levels that are suitable for the electronic system to operate, the power supply must also manage the energy flow efficiently between the photovoltaic module, battery, and system. Therefore, when energy is supplied from the photovoltaic module, the circuit charges the battery and provides energy for the system to operate, which consumes an average of 150 to 170 mA. If the photovoltaic module is unable to supply energy due to insufficient solar radiation at the installation site of the low-cost solarimetric station, the circuit uses the energy stored in the battery to keep the system running.

Data Acquisition Hardware

The control panel handles energy management and data acquisition commands implemented with a very low-consumption microcontroller. The system features this energy control functionality, as the equipment operates with the use of a battery, which demands the need for the lowest possible energy consumption, enabling the improvement of circuit independence. Thus, the energy management circuit presents complete control over all peripherals used in the system, activating and deactivating according to the equipment's needs. Using the low-consumption real-time clock that provides the time base for sampling, the processor energizes the sensors once per second, samples the magnitudes of temperature, humidity and irradiation, and then turns the sensors off to save energy. Over a period of thirty seconds the data is integrated and the image-processing circuit is activated to capture and process a snapshot of the sky at the center of the sampling interval in which the average is integrated.

In addition to the main function of synchronizing the system clock's date and time in order to ensure that the stored data has an accurate time stamp, the GPS also provides geolocation data in order to determine the precise location of the equipment at the facility. In addition, latitude and longitude data are used by the diffuse radiation prediction algorithm and to determine what time the system should start and end acquisition during the day. Since the time stamp provided by the GPS is synchronized to the clock in real time, the GPS may be turned off in order to increase the array's energy efficiency, as the consumption presented by the GPS module is high when compared to the operating consumption of the real-time clock.

Humidity and ambient temperature sensors are integrated into a single package, providing digital information. The pyranometer has analog output in amplitudes on the order of mV, therefore an analog converter with a built-in preamplifier was used. These sensors are interconnected to the processor via the I2C serial bus, and are only activated for data collection, and deactivated for reduced overall consumption.

The wireless communication circuit provides the user with a means to collect the data generated by the equipment, and the data is then collected using a cellular telephony application in which it is possible to check the operating status of the equipment, in addition to performing a preliminary analysis on the results obtained. In addition, to store the data collected from peripheral components during the equipment's operating time, the acquisition circuit features a data logger with an internal memory where the data will be saved, which can be collected using the wireless communication circuit where, after being extracted successfully, the data is cleaned, freeing up memory space for the continued operation of the equipment.

Figure 2:
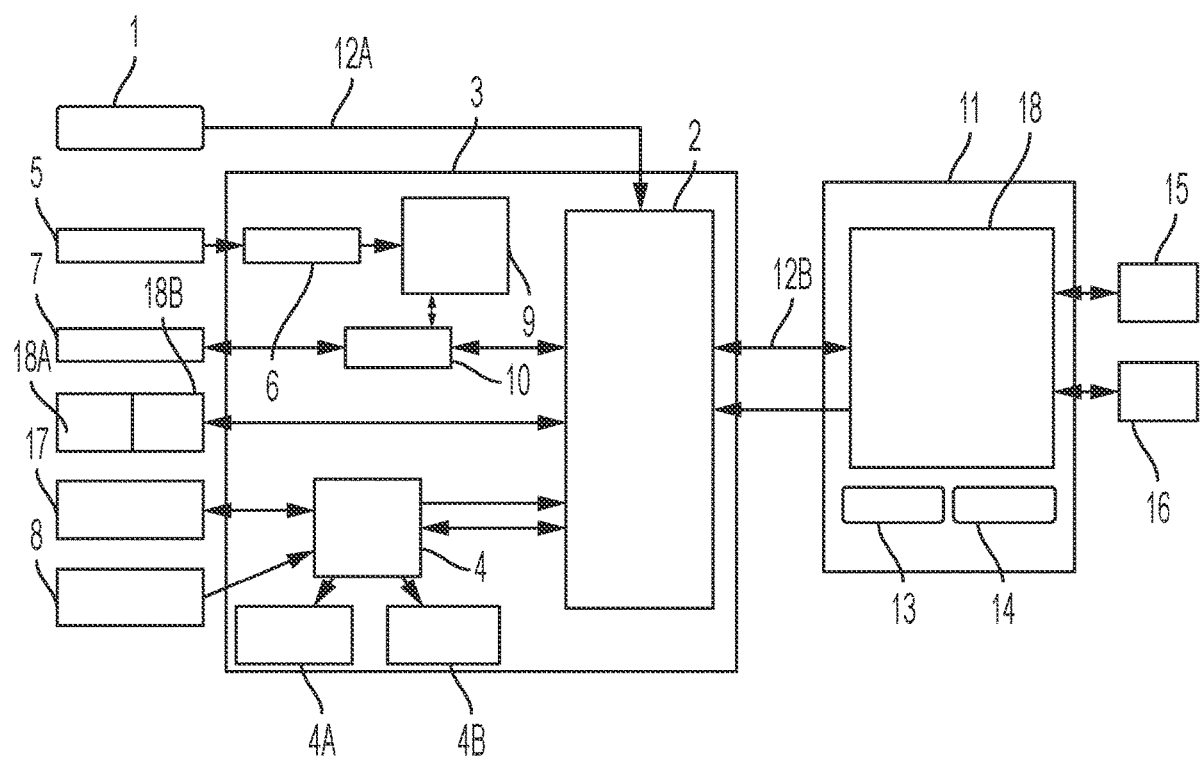
FIG. 2 shows a simplified block diagram of data acquisition hardware. The GPS (1) in serial communication (12A) with the CPU (2) with a real-time clock, the control panel (3), the energy management module (4) that integrates the 3.3V power supply to the GPS, CPU, ADC and sensors (4A). In addition, the energy management module also integrates 5V power supply for the processor and the modem (4B). The pyranometer (5) is connected to the signal conditioning module and filters (6) on the control panel. The humidity and temperature sensor (7) communicates with the I2C bus (10) that communicates with the CPU (2). The battery (17) connects to the energy management module (4). The photovoltaic module (8) connected to the energy management module. The button module (18A) and LED (18B) that communicate with the CPU (2). The signal conditioning module and filters (6) communicate with the analog-to-digital converter (9). The analog-to-digital converter (9) communicates with the bus (10). The control panel (3) communicates communicates [sic] with the additional embedded processor (11) via serial communication (12B) and returns a ready signal to the control panel. The processor module (17) is also comprised of the memory (13), the wireless communication module—Wi-Fi, (14) and its CPU (18). The fisheye camera (15) communicates with the processor and the modem (16) for applications such as cellular, tablet or microcomputer, and this communicates with the CPU (2).
Figure 3:
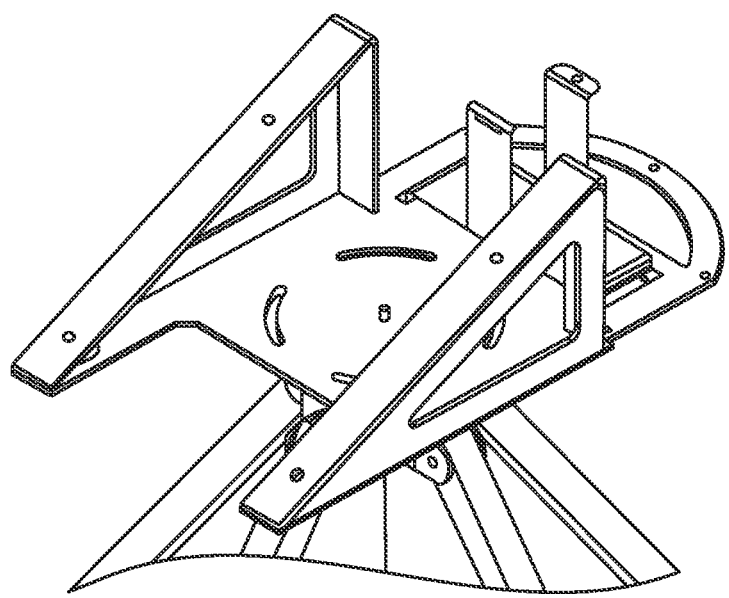
FIG. 3 shows the detail of the azimuth adjustment system.
Figure 4A:
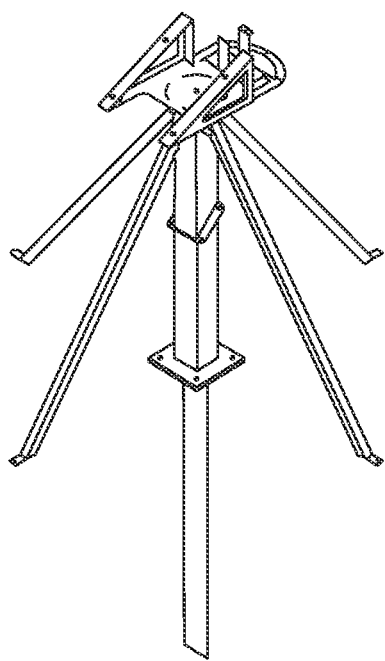
FIG. 4A shows how the azimuth adjustment system is attached by a stake.
Figure 4B:
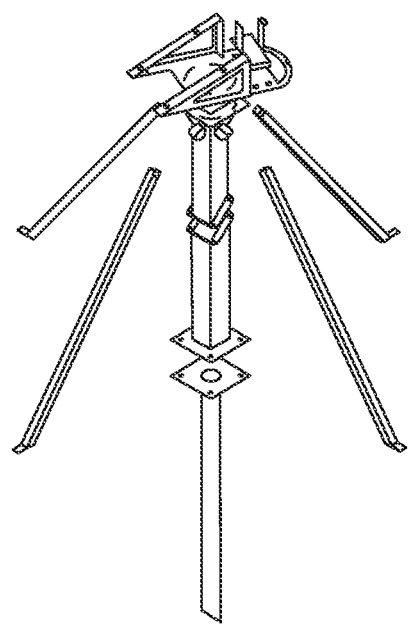
FIG. 4B shows the exploded view of how the azimuth adjustment system is attached by a stake.
Figure 5A:
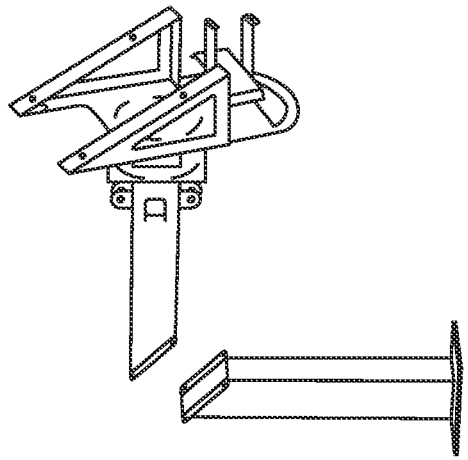
FIG. 5A shows how the azimuth adjustment system is attached to a wall.
Figure 5B:
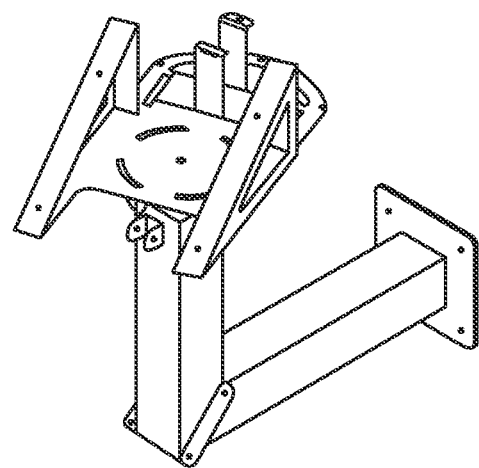
FIG. 5B shows the exploded view of how the azimuth adjustment system is attached to a wall.
Figure 6:
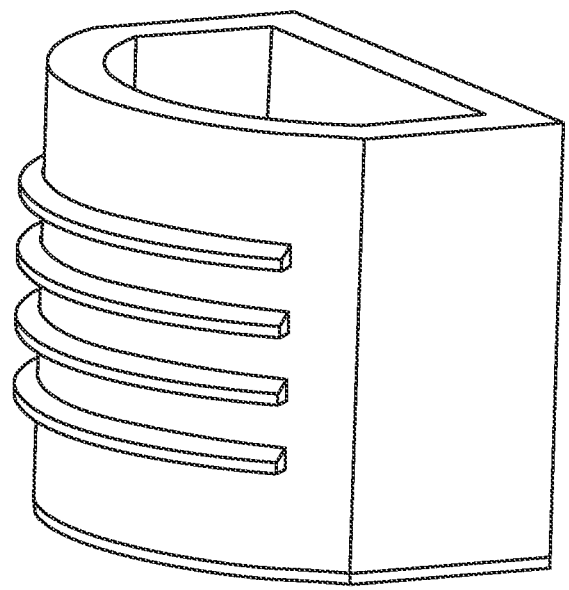
FIG. 6 shows the protective battery and sensor housing constructed of fiberglass.
Figure 7:
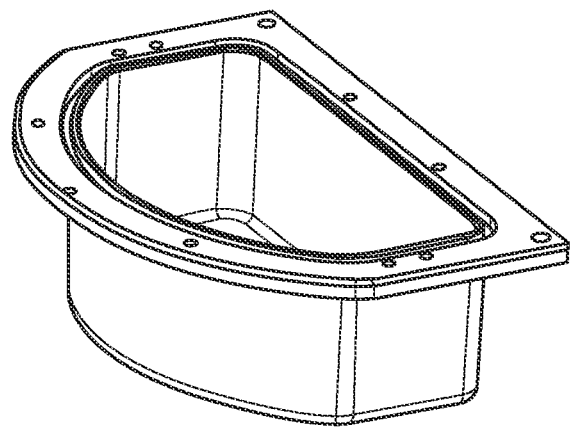
FIG. 7 shows the base of the electronics housing built of fiberglass.
Figure 8:
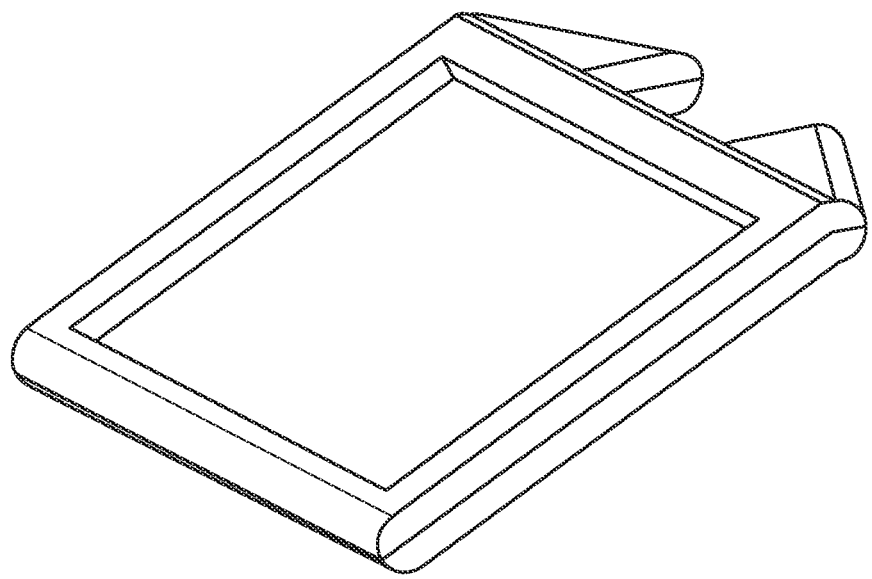
FIG. 8 shows the base of the photovoltaic module.
Figure 9:
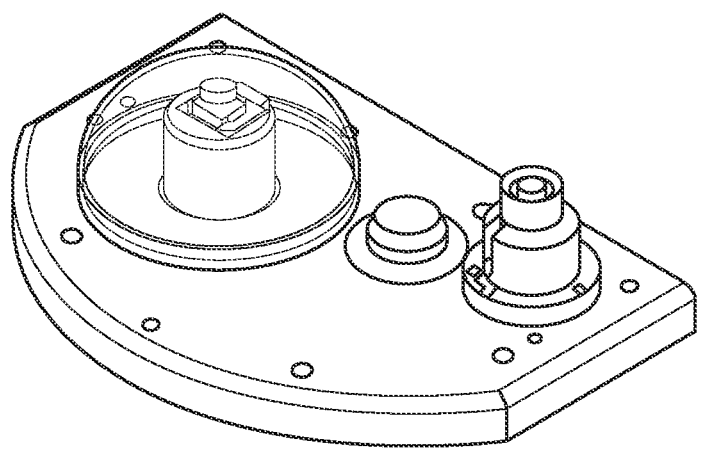
FIG. 9 shows the lid with its components.
Figure 10:
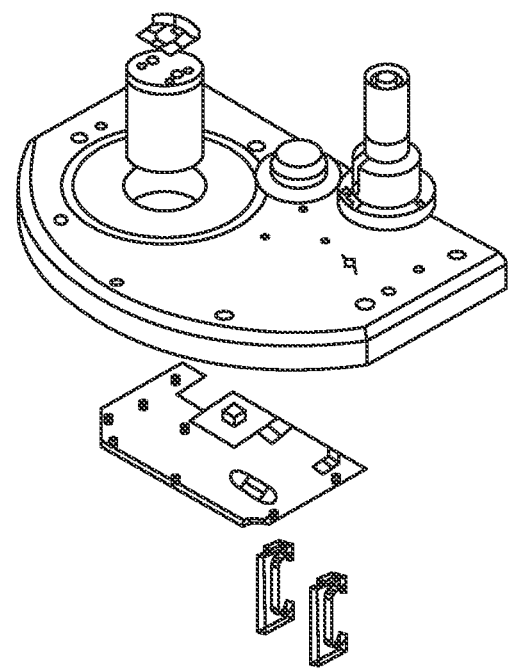
FIG. 10 shows the exploded view of the lid with its components.
Figure 11:
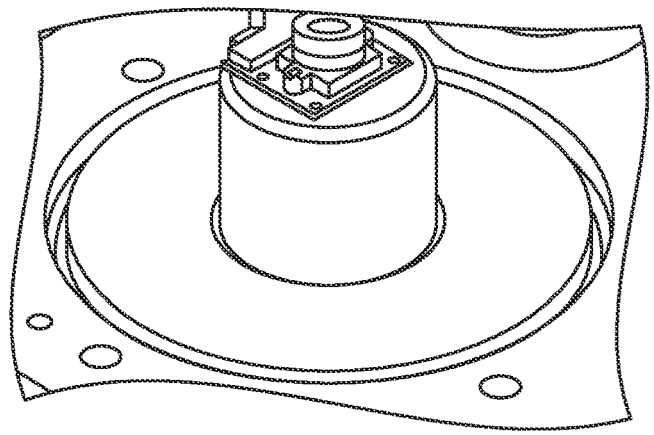
FIG. 11 shows the detail of the groove for attaching the dome.
Figure 12:
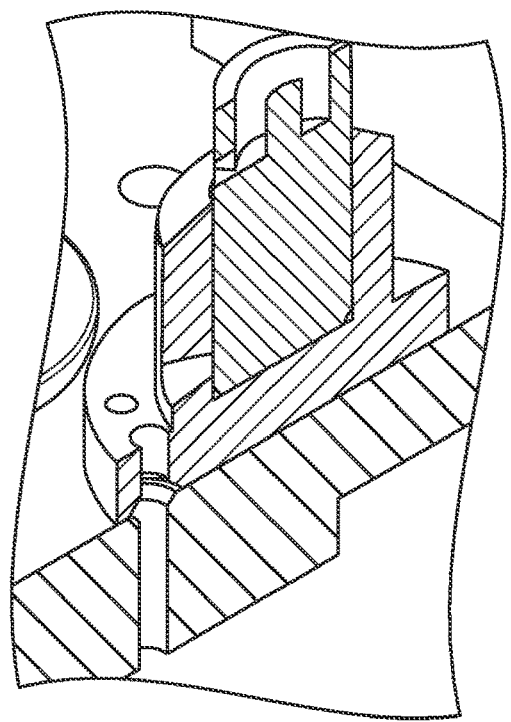
FIG. 12 shows the detail of the pyranometer inlet seal.
Figure 13:
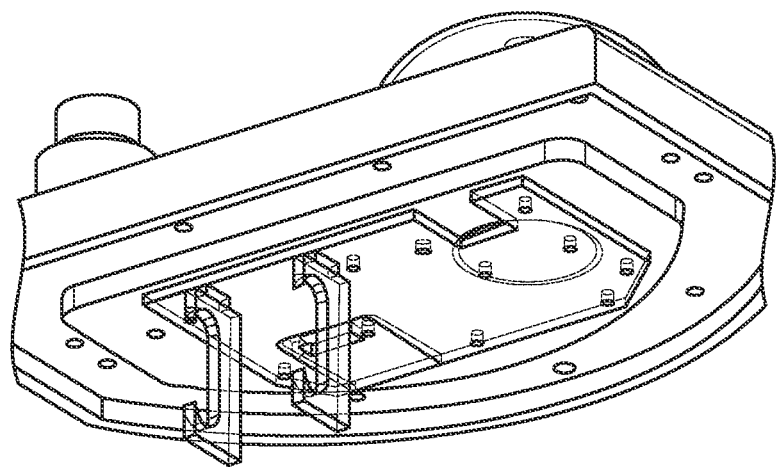
FIG. 13 shows the detail for how the camera support is attached.
Figure 14:
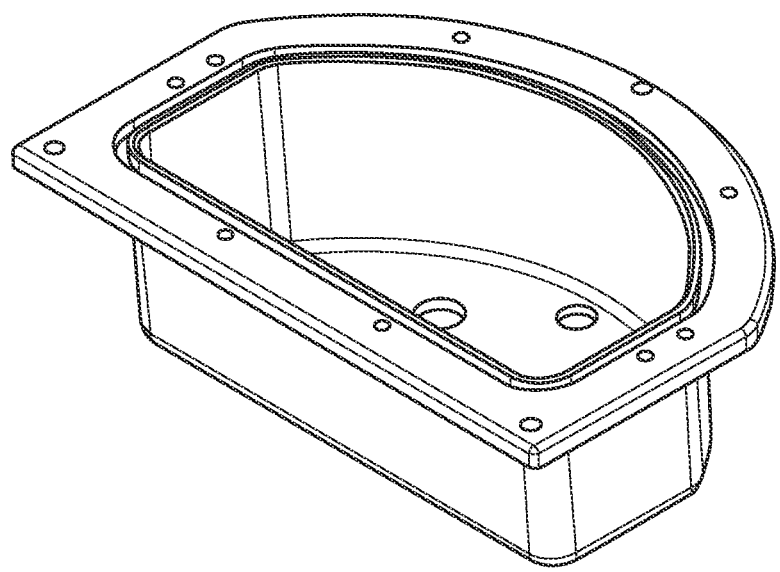
FIG. 14 shows the casing sealing groove.
Figure 15:
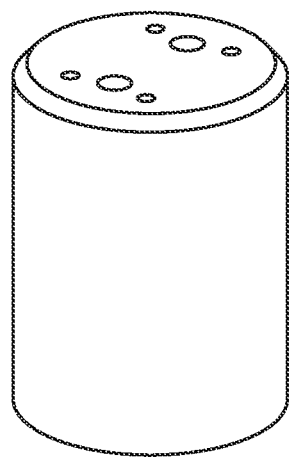
FIG. 15 shows the camera support dowel.
Figure 16:
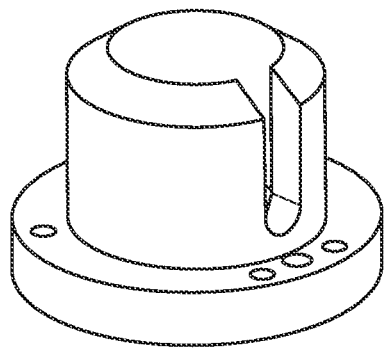
FIG. 16 shows the pyrometer support.
Figure 17:
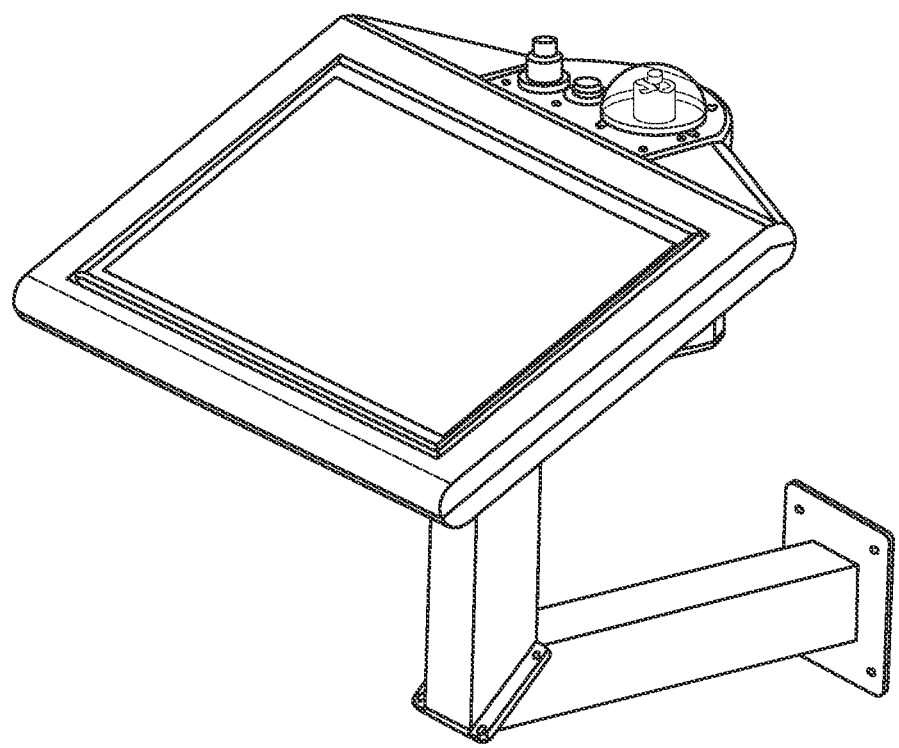
FIG. 17 shows the complete assembly of the low-cost solarimetric station.
Figure 18:
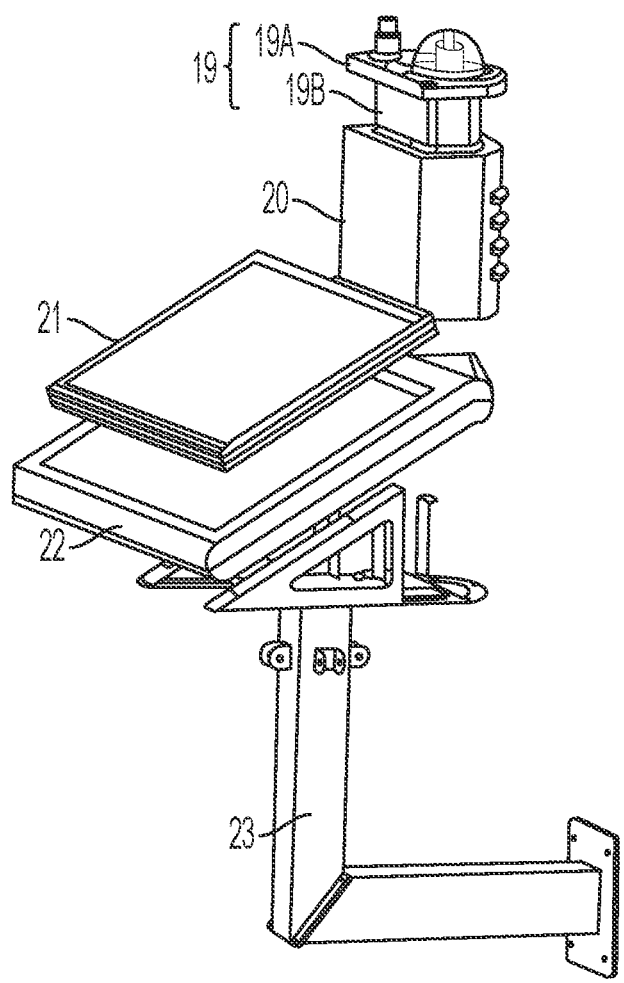
FIG. 18 shows the exploded view of the complete assembly of the low-cost solarimetric station and with wall mounting (horizontal). The electronics housing (19) with the lid (19A) and the base (19B), the protective housing (20), the photovoltaic module (21), the photovoltaic module base (22), and the low-cost solarimetric station support (23).
Figure 19A:
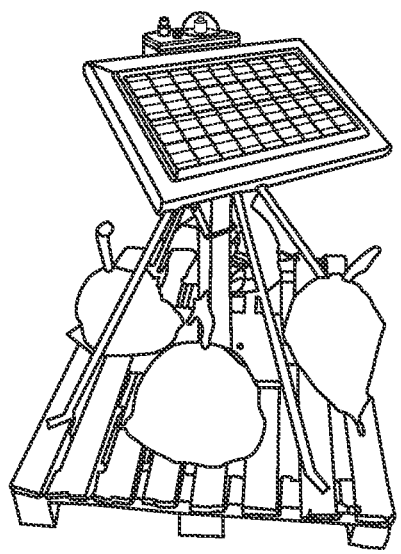
FIGS. 19A and 19B shows two photos of the low-cost solarimetric station.
Figure 19B:
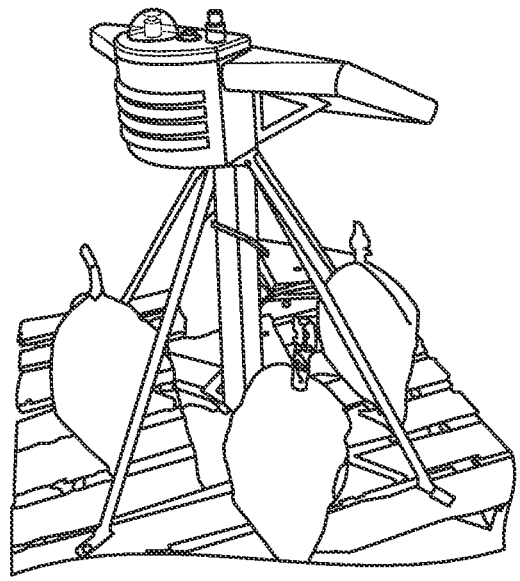

Image processing is performed by an additional embedded processor 11 (FIG. 2). The main function of the additional embedded processor is to manage acquisition of the image of the sky from the camera and to handle the image, storing the data consolidated by the acquisition circuit, which can then be deactivated by the power management circuit at night when there is no need to capture images.

To store the data collected from the peripherals during the equipment's operating time, the acquisition circuit features a data logger with an internal memory where the data will be saved, which can be collected using the wireless communication circuit where, after being extracted successfully, the data is cleaned, freeing up memory space for the new measurements.

Machine Learning

Figure 20:
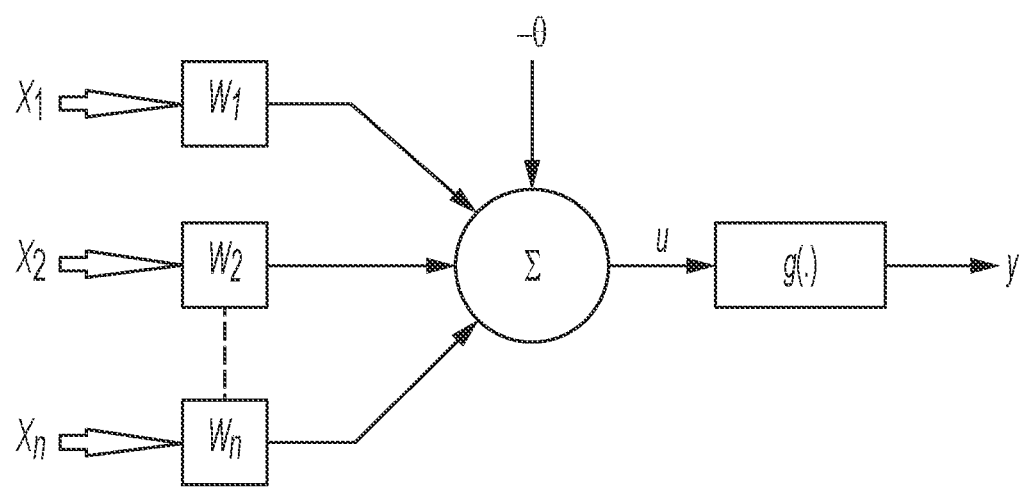
FIG. 20 shows an artificial neuron.
Figure 21:
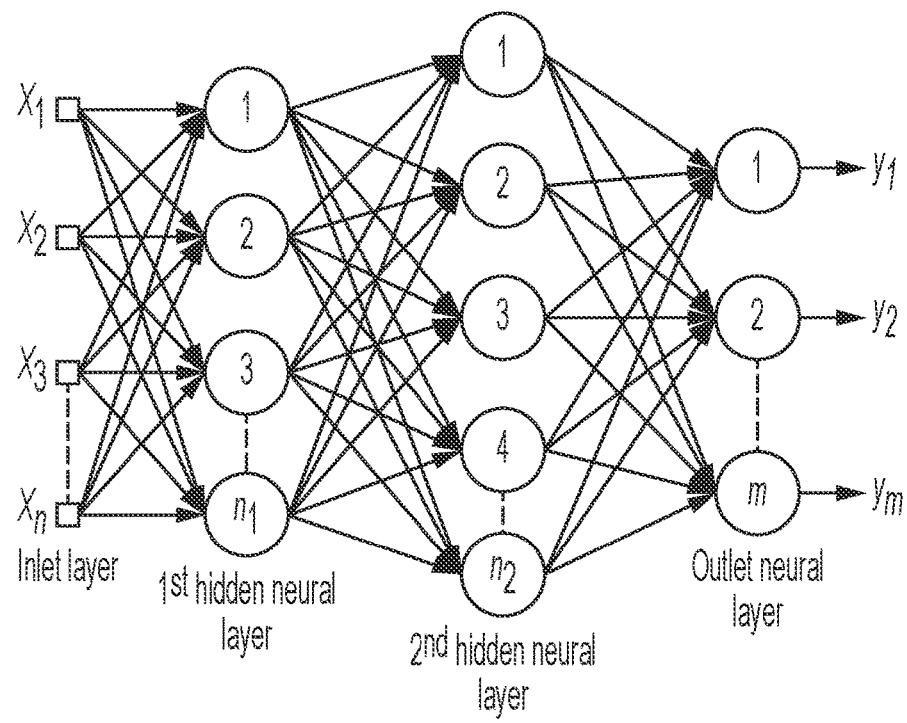
FIG. 21 shows a representation of a Multi-Layer Perceptron (MPC) Artificial Neural Network (ANN).

Regression methods may be used to estimate or predict the desired information using the extracted features. One of the methods widely used today is Artificial Neural Networks (ANN), which are computer models inspired by the nervous system of human beings. An ANN is comprised of one or more artificial neurons (FIG. 20) interconnected through synaptic connections, whose purpose is to simulate the Nervous System (NS) of human beings. The neuron shown in FIG. 21 is comprised of seven parts:

Input signals (x1, x2, xn): signals or samples from the external environment, which are normalized to ensure ANN efficiency Synaptic weights (w1, w2, wn): values for weighting inputs, quantifying the relevance of each one Linear aggregator (Σ): sums all weighted inputs to produce an activation signal Activation threshold (θ): value used to activate or not activate the artificial neuron Activation potential (μ): the value produced by the difference between Σ and θ

Activation function (g): the function to limit the output value of the neuron within a stipulated range Output (y): the final value produced by the artificial neuron from a set of inputs Performing all 7 steps described above, it is possible to determine the mathematical representation of the neuron, given by the expressions 1.1 and 1.2

$$u = \sum_{i=1}^{n} w_i \cdot x_i - \theta = y = g(u) \quad (1.1)$$

$$y = g(u) \quad (1.2)$$

As mentioned, ANN aims to simulate the functioning of the NS, and to do that several neurons must be connected to imitate some characteristics of the NS. One of the existing types of ANN that provides a good representation of the NS is the Multilayer Perceptron (MPC) ANN, and it is also one of the most-used types of ANN. That network is characterized by containing an input layer, one or more hidden layers, and an output layer, where each layer may contain n neurons. The composition of an MPC is shown in FIG. 21.

Figure 22:
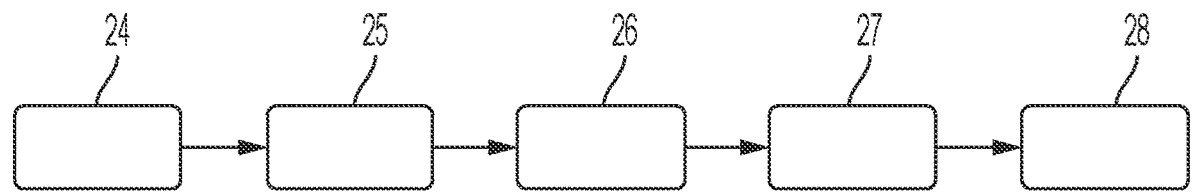
FIG. 22 shows the flowchart of the embedded machine learning software for estimating diffuse irradiance. Data acquisition (24) starts the process, which goes to the pre-processing step (25). After pre-processing, features are extracted (26), followed by regression (27), until the diffuse irradiance (28) is estimated.

Each numbered circle of the MPC ANN shown in FIG. 21 is comprised of one neuron (FIG. 20), whose inputs (x1, x2, xn) are the outputs (y) of the neurons from the previous layer. Stipulating the MPC ANN to compose the regression step, the machine learning software developed for the low-cost solarimetric station was structured as shown in FIG. 22.

In the first block, Data Acquisition, the AM system developed basically acquires data through the pyranometer, temperature and humidity sensors, in addition to capturing an image of the sky.

After this data acquisition, it is necessary to pre-process the acquired data, such as concatenating the data in files in a specific format, verifying inconsistencies in the data, adjusting the image size, and other relevant adjustments, if necessary.

In the next step, features are extracted from the captured image of the sky. This extraction of features consists of obtaining the RGB diagrams of the image, and the resulting data from the extracted diagrams are concatenated with the pre-processed data acquired in the previous step.

The data set obtained in the pre-processing step and feature extraction are used as inputs to the regression model, and for this project an MPC ANN-based model was used.

Finally, the results of data processing through the regression model provide the diffuse irradiance, which process is shown in the flowchart in FIG. 22.

The regression system used is comprised of a Multilayer Perceptron (MPC) Artificial Neural Network (ANN), shown in FIG. 21.

To train the regression model, the MPC ANN, the database created from the first two blocks (Data Acquisition and Pre-Processing) presented in FIG. 22 was used. The model's training algorithm is shown in FIG. 23.

Figure 23:
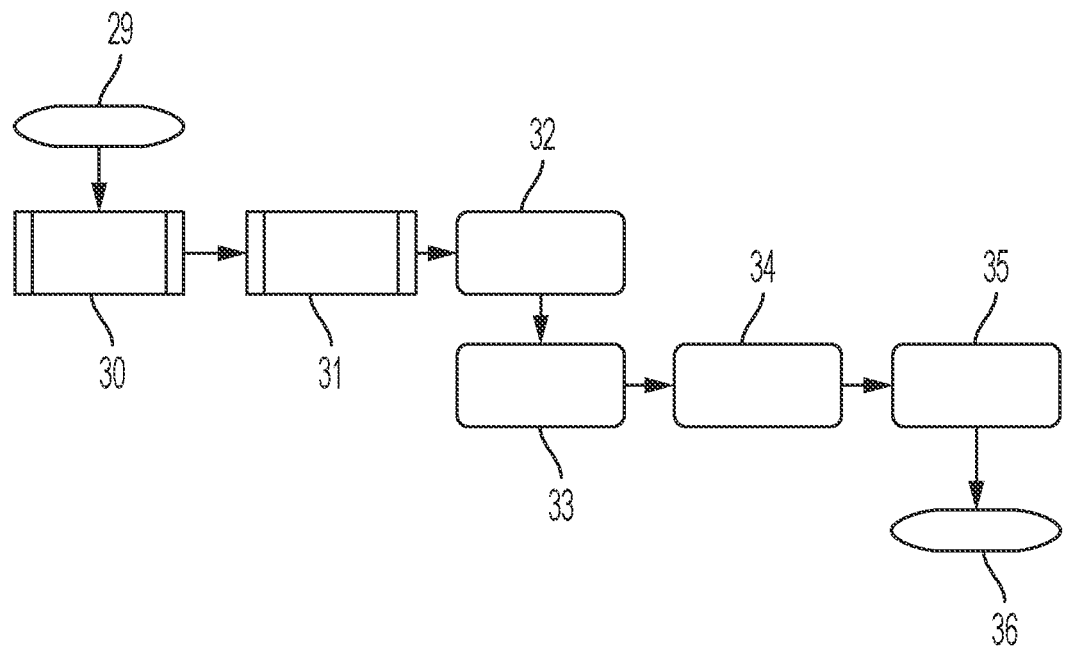
FIG. 23 shows the flowchart of the regression-model training algorithm. The beginning of the process (29) starts with loading the data (30) and then building the ANN model (31). After these steps, it is necessary to train the ANN (32), to test/assess the ANN (33), to save the ANN model (34), to save the ANN synaptic weights (35), and to end the process (36)

The algorithm shown in FIG. 23 occurs first by loading the data for training, the database created by the previous steps. [sic]

After loading the data, the step of constructing the MPC ANN model begins, in which some configurations must be defined to compile the ANN model.

After building the model, network training is performed. Tensorflow and Keras libraries were used in this training, both for development in the Python language.

Next the ANN is tested using Tensorflow and Keras tools to verify the efficiency and the power to generalize the network to estimate diffuse irradiance.

Finally, after training and testing, the information from the network model and synaptic weights are saved to be loaded into the embedded diffuse irradiance estimation software.

Figure 24:
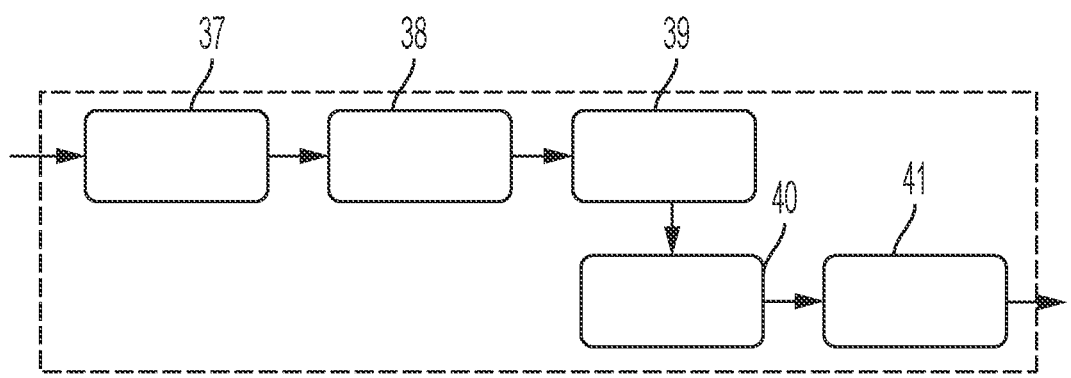
FIG. 24 shows the data-loading step for ANN training: load database (37), delete date, time and diffuse irradiance (38), normalize data (39), save diffuse irradiance in another variable (40), separate data on training and testing (41).

In the data-loading step, some specific steps must be performed. These steps can be seen in FIG. 24.

Figure 25:
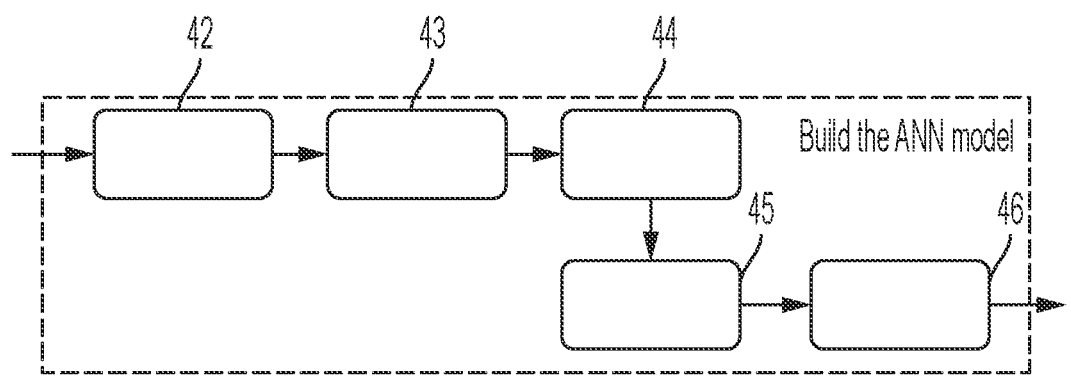
FIG. 25 shows the ANN model construction step: add layer structures (42), define the optimizer (43), define the loss function (44), define the metrics (45), compile the model (46).

In this step, the data is loaded and selected. Date, time and diffuse irradiance information are excluded from the data set. The remaining data are considered the input data for the ANN and all are normalized using the tools from the sklearn library. The diffuse irradiance is assigned to another variable, which will be considered the network output. After this separation between input and output data, both sets are further divided into training and testing sets. After this separation, it exits from the Load data function and the algorithm flow goes to the next ANN model construction function, represented by the flowchart of FIG. 25.

In the step of building the ANN model, some fundamental configurations are performed both for training and for the final embedded model.

In this step, first the layers comprising the network are added, including the input layer, intermediate layers, and the output layer. During the addition of each layer, the number of neurons and the type of activation function of each layer are configured simultaneously. All layers use the Rectified Linear Unit (ReLU) activation function. In the step of building the ANN model, some fundamental configurations are performed both for training and for the final embedded model.

In this step, first the layers comprising the network are added, including the input layer, intermediate layers, and the output layer. During the addition of each layer, the number of neurons and the type of activation function of each layer are configured simultaneously. For this project, the input layer was considered with the amount of input in accordance with the amount of data from a line from the database, 5 hidden layers with 110 neurons each and the output layer with only 1 neuron. All layers use the Rectified Linear Unit (ReLU) activation function.

After defining the model the optimizer is defined, which, like the model, updates synaptic weights and activation thresholds during training based on input data and the loss function. The optimizer used is the RMSprop (Root Mean Square propagation), which updates the synaptic weights by dividing the learning rate by the mean of the square root of the gradient, multiplying by the gradient itself.

Once the optimizer has been defined, the loss function must be defined, which measures the precision of the network during training, which in this project was defined as the MSE (Mean Squared Error).

The last definition is the metric determination, which is used to monitor the ANN training and testing steps. For the project, the MSE (Mean Squared Error) and MAE (Mean Absolute Error) metrics were chosen.

After all the definitions, the model is compiled and the main algorithm flow follows, performing the network training.

With the training done and the model and synaptic weights acquired, the information is loaded into the embedded diffuse irradiance estimation software to perform the diffuse irradiance estimate and subsequent calculation of direct irradiance.

Embedded Diffuse Irradiance Estimation System

The five pieces of information needed for training are humidity, temperature, sky image, global irradiance, and diffuse irradiance. The necessary information for the embedded diffuse irradiance estimation software are humidity, temperature, image of the sky, and global irradiance.

After the training has been done and the model and synaptic weights have been exported, that information must be loaded into the embedded diffuse irradiance estimation software to estimate diffuse irradiance. The diagram of the system algorithm is shown in FIG. 26.

Figure 26:
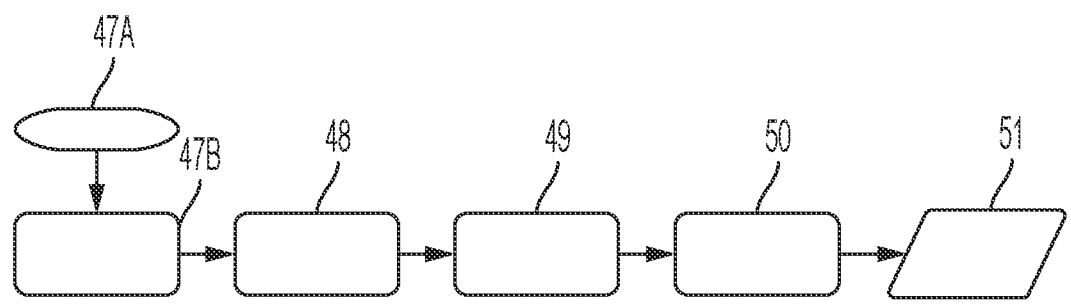
FIG. 26 shows the embedded diffuse irradiance estimation system: start (47A), start the system—LOG (47B), initiate the camera (48), load the DNA model (49), connect to the MQTT server (50), main loop (51).

FIG. 26 shows that the algorithm flow is initiated with the LOG system initialization step. In this system, essential information for monitoring the functions of the estimation system is collected.

The next step is the "instantiation" of the camera, in which the basic camera settings and function definitions that will be used to capture the sky images are configured.

After instantiating the camera, the trained ANN is loaded into the training system, as previously discussed, where the ANN model and the synaptic weights obtained with the training are loaded.

Continuing with the flow of the algorithm, it is connected to the MQTT server (MQ Telemetry Transport) to coordinate the image capture and to estimate the diffuse irradiance with the general manager of the embedded system.

Figure 27:
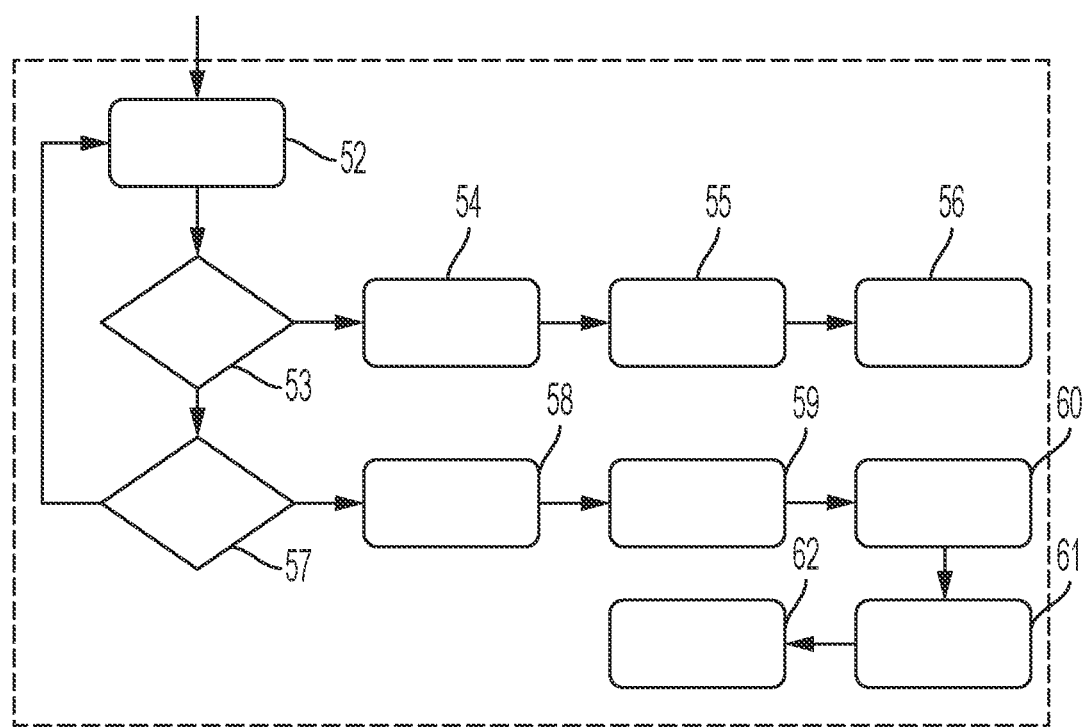
FIG. 27 shows the main loop of the embedded estimation system: wait for a message (MQTT) (52), topic PHOTO? (53), if yes, capture image (54), extract the RGB diagram (55) and store data—global variable (56), if no, topic DATA? (57), if yes, obtain data (temperature, humidity, and global irradiance (58), concatenate data with the RGB diagram (59), normalize data (60), estimate diffuse irradiance (61), and publish the result (62). If no, return to wait for a message (MQTT) (52).

Finally, the main loop is executed, continuously and uninterruptedly, performing the tasks of image capture and estimation. The representation of the main loop algorithm is shown in FIG. 27.

The main loop is awaiting the arrival of a topic/message managed by the MQTT serve. When the topic is received, whether it is a PHOTO or DATA is analyzed. If the topic is a PHOTO, the image of the sky is captured and then the RGB diagram is extracted. This diagram is assigned to a global variable that will be used by the DATA topic. If the topic is DATA, the message loaded by the topic is decoded and the information on humidity, temperature, and global irradiance, acquired by the general manager of the embedded system, is separated. After separation, the RGB diagram is concatenated with all this information, and then the data is normalized using sklearn tools.

Finally, the diffuse irradiance is estimated, and the result is transmitted via MQTT to the general manager of the embedded system.

The cycle presented in this section is repeated until the moment that the general manager turns off the equipment.

The invention claimed is:

1. A low-cost autonomous solarimetric station comprising:
   a single sensor for measuring photodiode pyranometer-type global irradiance;
   a camera with a low-cost sensor, fisheye lens, and dome;
   a breakdown of direct and diffuse global irradiance components using algorithms, hemispheric photographs, and high-frequency signal analysis;
   secondary meteorological variables (ambient temperature and humidity) obtained from thermohygrometer measurement;
   time and location variables provided by GPS;
   a wireless communication facility, including of a remote wireless data configuration, monitoring, and downloading, using smartphones, tablets, and notebooks;
   a compact autonomous station with solar power from a photovoltaic module, battery, and charge controller;
   for azimuth adjustments and attachment to horizontal or vertical planes;
   an application via cellular telephony for monitoring and manual collection of data;
   an enclosure with a place to accommodate the station's materials and components;

swivel rods for installation on horizontal and vertical surfaces; and embedded machine learning software for diffuse irradiance estimation and subsequent direct irradiance calculation.

2. The low-cost autonomous solarimetric station of claim 1, further comprising a micro controller-based data logger with internal memory (data logger) for measuring and storing photos, which uses an RTC (Real Time Clock) to place a time stamp on photos and measurements and store the data in a data logger with internal memory.

3. The low-cost autonomous solarimetric station of claim 2, further comprising a data logger with internal memory for saving data collected using the wireless communication circuit during data storage from peripheral components by the operating time of the equipment.

4. The low-cost autonomous solarimetric station of claim 3, further comprising a data logger with internal memory, wherein after the data is successfully extracted, the data is cleaned, freeing the memory space for continued operation of the equipment.

5. The low-cost autonomous solarimetric station of claim 2, further comprising a 16-bit analog-digital converter that communicates with the master microcontroller via 12C protocol.

6. The low-cost autonomous solarimetric station of claim 2, wherein the camera captures images of the sky every minute and sends the photos to the data logger with internal memory, which stores the images with the respective time stamp.

7. The low-cost autonomous solarimetric station of claim 1, wherein the photodiode pyranometer sensor is attached to a leveling base, which has a bubble-type level.

8. The low-cost autonomous solarimetric station of claim 1, further comprising an operational amplifier to amplify the output signal from the photodiode pyranometer sensor.

9. The low-cost autonomous solarimetric station of claim 1, further comprising an image acquisition module with a dome to protect the camera from rain and dust.

10. The low-cost autonomous solarimetric station of claim 1, wherein the fisheye lens increases the capture angle of the camera image.

11. The low-cost autonomous solarimetric station of claim 1, further comprising an in-camera filter to minimize the saturation effect caused by the reflection of the camera's dome when the sky is clear.

12. The low-cost autonomous solarimetric station of claim 1, wherein the power is provided by a photovoltaic module that charges a 7Ah battery and nominal voltage of 12V, and has a charge controller.

13. The low-cost autonomous solarimetric station of claim 12, wherein the photovoltaic model has capacity of 30 W and output of 20 V.

14. The low-cost autonomous solarimetric station of claim 12, wherein the photovoltaic module is connected to an energy management block that provides output voltages of 5 V and 3.3 V.

15. The low-cost autonomous solarimetric station of claim 1, wherein estimated measurements for direct and diffuse irradiance components are taken using machine learning algorithms and subsequent calculation of direct irradiance.

16. The low-cost autonomous solarimetric station of claim 1 further comprising a regression system including a Multi-Layer Perceptron-type of Artificial Neural Network (ANN).

17. The low-cost autonomous solarimetric station of claim 16, wherein the ANN model is built by adding the constituent layers of the network, and after defining the model, defining the optimizer.

18. The low-cost autonomous solarimetric station of claim 17, wherein the optimizer uses the synaptic weights by dividing a learning rate by the mean of the square root of the gradient, multiplying by the gradient itself.

19. The low-cost autonomous solarimetric station of claim 16, wherein it compiles the ANN model and follows the flow of the main algorithm, performing network training, with 300 training periods.

20. The low-cost autonomous solarimetric station of claim 1, wherein the information on the network training, model, and synaptic weights are loaded in the embedded diffuse irradiance estimation software.

21. The low-cost autonomous solarimetric station of claim 20, wherein the embedded diffuse irradiance estimation software estimates the diffuse irradiance and subsequently calculates direct irradiance.

* * * * *